United States Patent [19]

Tanaka et al.

[11] Patent Number: 4,591,911
[45] Date of Patent: May 27, 1986

[54] PICTURE FILTER USING AN AMPLITUDE CORRELATOR

[75] Inventors: Yutaka Tanaka; Takashi Okada, both of Yokohama, Japan

[73] Assignee: Sony Corporation, Tokyo, Japan

[21] Appl. No.: 741,014

[22] PCT Filed: Dec. 25, 1981

[86] PCT No.: PCT/JP81/00409
§ 371 Date: Aug. 24, 1982
§ 102(e) Date: Aug. 24, 1982

[87] PCT Pub. No.: WO82/02310
PCT Pub. Date: Jul. 8, 1982

Related U.S. Application Data

[63] Continuation of Ser. No. 413,376, Aug. 24, 1982, abandoned.

[30] Foreign Application Priority Data

Dec. 27, 1980 [JP] Japan .................. 55-186664

[51] Int. Cl.[4] .................. H04N 5/14; H04N 9/78; H04N 5/21
[52] U.S. Cl. .................. 358/160; 358/31; 358/36; 358/167
[58] Field of Search .................. 358/31, 36, 160, 167; 382/51, 52, 53; 375/96; 367/43, 44; 369/46; 343/5 DP, 14, 17.7

[56] References Cited

U.S. PATENT DOCUMENTS

| | | | |
|---|---|---|---|
| 3,805,239 | 4/1974 | Watanabe | 382/51 |
| 4,141,034 | 2/1979 | Maxemchuk et al. | 358/31 |
| 4,178,609 | 12/1979 | Beutal | 358/31 |
| 4,241,363 | 12/1980 | Maeyama et al. | 358/31 |

Primary Examiner—Tommy P. Chin
Assistant Examiner—Michael D. Parker
Attorney, Agent, or Firm—Lewis H. Eslinger; Alvin Sinderbrand

[57] ABSTRACT

A picture filter for use in such a case and the like that a luminance signal and a chrominance signal are separated from each other, and particularly to separate precisely a desired video signal from a video signal containing a plurality of signals having different information contents. In order that amplitude levels at adjacent plural points $S_i$, $S_{i+1}$, ..., and $S_j$, $S_{j+1}$, ... in a picture are filtering-processed on a plurality of amplitude level axis spaces, there is provided an amplitude correlator 20 to discriminate the amplitude level and polarity to thereby filter-process the same.

11 Claims, 20 Drawing Figures

PICTURE FILTER USING AN AMPLITUDE CORRELATOR

This is a continuation of application Ser. No. 413,376, filed 8-24-82, now abandoned.

TECHNICAL FIELD

This invention relates to a picture filter such as a comb filter or the like used in a television receiver, which separates a video signal with a specific information from a video signal containing a plurality of signals having different information contents.

BACKGROUND ART

As will be well-known, a comb filter used in a television receiver and the like is to separate a video signal (television signal) on a frequency axis. Since such prior art separation filter on the frequency axes is not generally applicable, it performs a calculation process in such a manner that a mean value in all areas on a picture screen becomes an optimum value thus resulting in a remarkable error in a local part such as an edge of the picture.

By way of example, if the video signal for television is processed by the aforesaid comb filter, a dot interference and the like are likely to occur.

DISCLOSURE OF INVENTION

In view of the above points, this invention makes it possible to separate only a desired video signal from the characteristics in only a small part of a picture, in which the video signal is not separated on the frequency axis as in the prior art filter, but the filtering processings are performed on the amplitude level axis spaces so as to separate the video signal therefrom.

If the video signal is separated on the amplitude level axis spaces as described above, it is possible to separate only the specific video signal with accuracy more than that of the conventional one. An improvement factor of S/N ratio done by the conventional comb filter is 3.0 dB, but in accordance with the present invention, it can be improved up to 4.26 dB.

BEST MODE FOR CARRYING OUT THE INVENTION

For the first embodiment of this invention, a filtering process for eliminating a noise component contained in a television signal will be described with reference to FIG. 1 and the following drawings.

Figure 1:
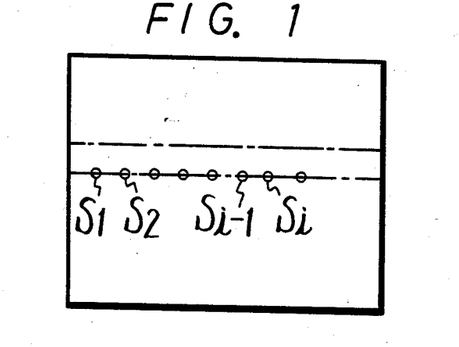
FIGS. 1 and 3 are diagrams used to explain adjacent picture elements.
Figure 2:
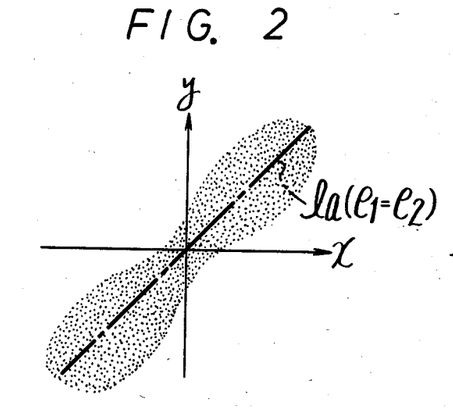
FIGS. 2, 4 and 5 are scattering diagrams each showing an amplitude level of the adjacent picture elements.

Picture elements when a luminance level of a video signal or television signal is sampled along a horizontal scanning direction are given as $S_1, S_2 \ldots S_i$ in FIG. 1, an amplitude level $e_1$ of the desired picture element $S_i$ is taken on the abscissa x of FIG. 2, and an amplitude level $e_2$ of the picture element $S_{i-1}$ adjacent to the picture element $S_i$ is taken on the ordinate y thereof. If the amplitude levels $e_1$ and $e_2$ between these adjacent picture elements are searched over the whole lines, the television signal has so strong correlation or correlativity between the adjacent picture elements that as shown in FIG. 2 a scattering diagram where the amplitude levels are concentrated on an axis $e_1 = e_2$ shown by a straight line $l_a$ is provided.

Figure 3:
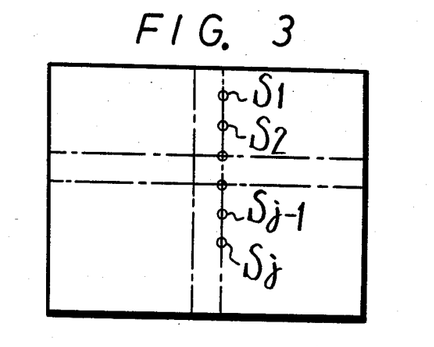

In like manner, picture elements along a vertical scanning direction are taken as $S_1, S_2 \ldots S_j$ shown in FIG. 3. Then, if an amplitude level $e_1$ of the picture element $S_j$ and an amplitude level of the picture element $S_{j-1}$ adjacent thereto are respectively searched over the whole vertical lines, in this case, the television signal has also so strong correlativity between the adjacent picture elements that as shown in FIG. 2, the levels $e_1$ and $e_2$ are concentrated in the vicinity of the axis $e_1 = e_2$, that is, the straight line $l_a$. Although the scattering characteristic is varied depending on the contents of the pictures, there is no change in the fact that they are concentrated on the axis $e_1 = e_2$.

As described above, it is apparent from the scattering diagram of FIG. 2 that the amplitude levels $e_1$ and $e_2$ of the television picture in both horizontal and vertical directions are very likely to be concentrated on the axis $e_1 = e_2$. This indicates that the luminance level of the television picture has strong correlativity between the neighbouring picture elements. In other words, there is a large probability that $e_1 \doteq e_2$ is established for the amplitude levels $e_1$ and $e_2$ between the adjacent picture elements.

Figure 4:
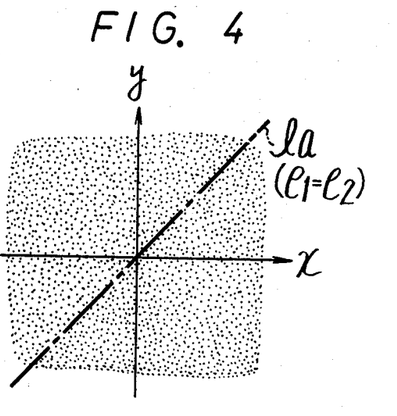

Whereas, a white noise having no video information has no correlativity between the adjacent picture elements. Accordingly, if scattering diagrams in the horizontal and vertical directions are made as shown in FIG. 4, the amplitude levels $e_1$ and $e_2$ are distributed uniformly on the x, y plane.

Figure 5:
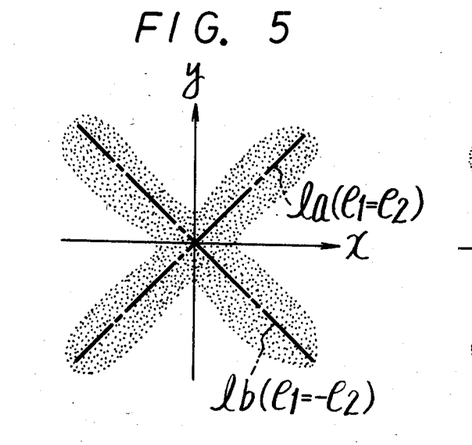

Moreover, the amplitude levels $e_1$ and $e_2$ between the adjacent picture elements in the video signal containing noises are distributed as illustrated in FIG. 5.

Thus, as will be clear from the above, studying at which part of the x, y plane the amplitudes of the adjacent picture elements makes it possible to discriminate whether the amplitudes of the picture elements are made by the picture or by the noise which is nothing to do with the video information. That is, when the amplitude levels $e_1$ and $e_2$ between the adjacent picture elements satisfy $e_1 = e_2$ (or $-e_1 = -e_2$), there is a large probability that the amplitude level $_1$ is made by the picture, Vice versa, when $e_1 = -{}_2$ (or $-e_1 = e_2$) is established, the probability that the amplitude level $e_1$ is made by the picture is smallest.

Therefore, if the polarities of these amplitude levels $e_1$ and $e_2$ are discriminated, it is possible to separate the video signal from the noise.

Figure 6:
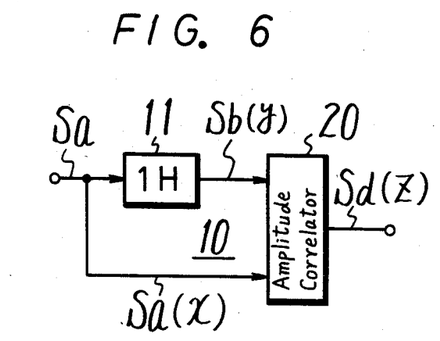
FIG. 6 is a conceptual systematic diagram showing one example of a picture filter according to the present invention.

FIG. 6 is a schematic systematic diagram of a picture filter 10 according to the present invention, in which an input television signal Sa is supplied to a delay circuit 11 to be delayed by only 1H, and a television signal Sb formed by this delay is supplied together with the signal Sa to an amplitude correlator 20, whereby the polarities and signal levels of both of them are discriminated.

Even when the polarities of the television signals Sa and Sb are coincident, other than the same amplitude level, it may be considered that the signals Sa and Sb may sometimes have different contents of the informations. Therefore, in order to reduce errors in the filtering processing as much as possible, this embodiment has such function that even in the case of the same polarities, the television signal Sa of the amplitude level $e_1$ is not produced over the entire amplitude levels, but except the same amplitude level, the television signal with a smaller amplitude level is produced.

Figure 7:
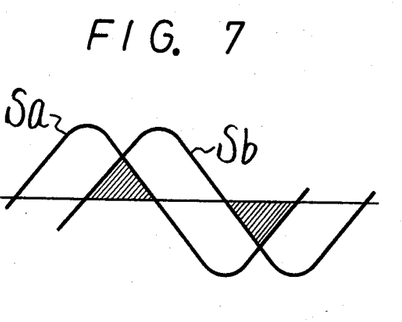
FIG. 7 is a waveform diagram used to explain the operation thereof.

To this end, when the television signals Sa and Sb are in such a relation, for example, as shown in FIG. 7, this amplitude correlator 20 produces signal regions shown by hatchings in the figure. The practical example of this amplitude correlator 20 and the calculation processing thereof will be described later.

An output $e_0$ produced from such amplitude correlator 20 as described above takes a value existing on an axis z of FIG. 8. In other words, the output $e_0$ resides on a point on a ridgeline $l_z$ of a pyramid (tetrahedron) formed by x, y and z planes and planes $P_x$ and $P_y$ including the ridgeline $l_z$. That is, when the correlativity exists and hence $e_1 = e_2$ is established, the output $e_0$ exists on the ridgeline $l_z$ showing $e_1 = e_2 = e_0$. When $e_1 > e_2$ is established, the output $e_0$ exists on the plane $P_x$ encircled by points O, P and R. When $e_1 < e_2$ is established, the output $e_0$ exists on the plane $P_y$ encircled by points O, Q and R. Thus when either of $e_1 = 0$ or $e_2 = 0$ is established, there is produced no output $e_0$.

Figure 9:
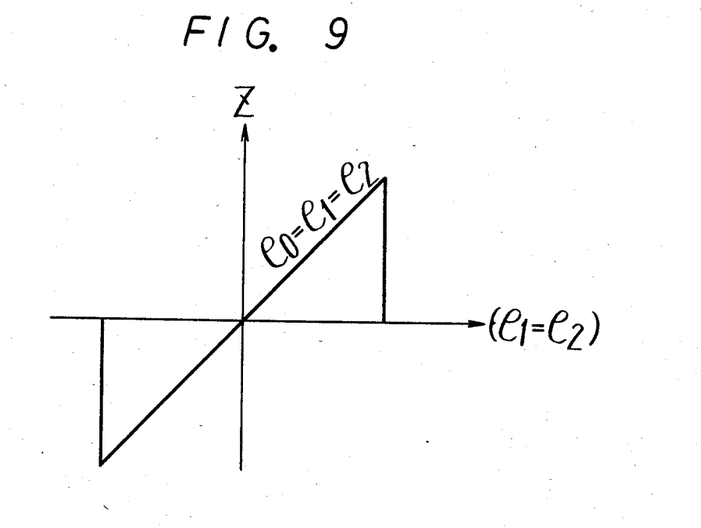

For reference, an output characteristic when $e_1 = e_2 = e_0$ is established is shown in FIG. 9.

Figure 8:
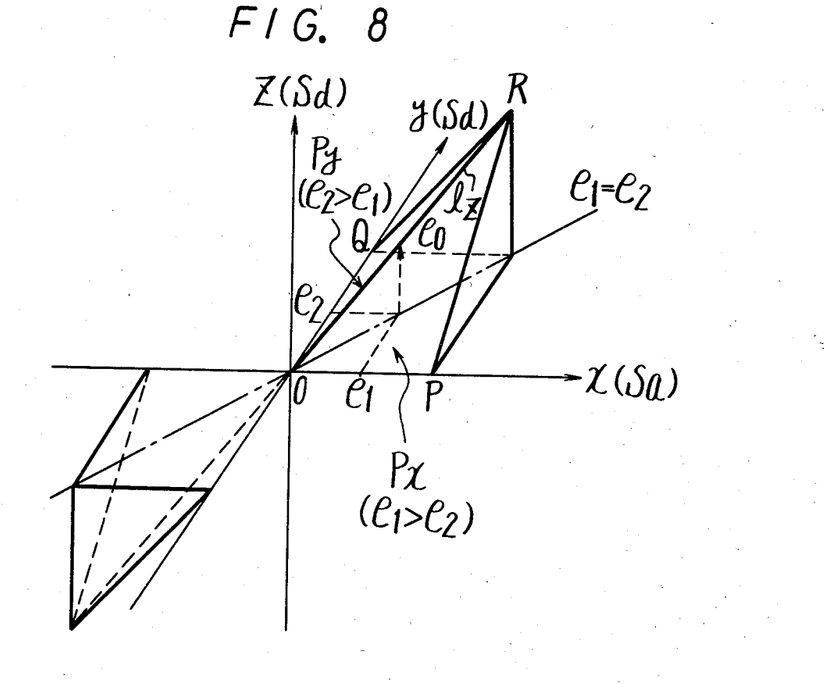
FIGS. 8 and 9 are graphs showing output characteristics according to the present invention.

As will be obvious from FIG. 8, by the calculation processing done by the circuitry of FIG. 6, a secondary picture filter with the axis $e_1 = e_2$ as a center is constructed in the space of the amplitude level axis, so that almost all of the noise components existing on the axis $e_1 = -e_2$ of FIG. 5 can be removed.

In this connection, if the conventional comb filter is considered as the secondary picture filter on the x- and y-axes, an output $e_0'$ thereof at that time is given by the calculation processing as follows.

$$e_0' = e_1 + e_2/2$$

Figure 10:
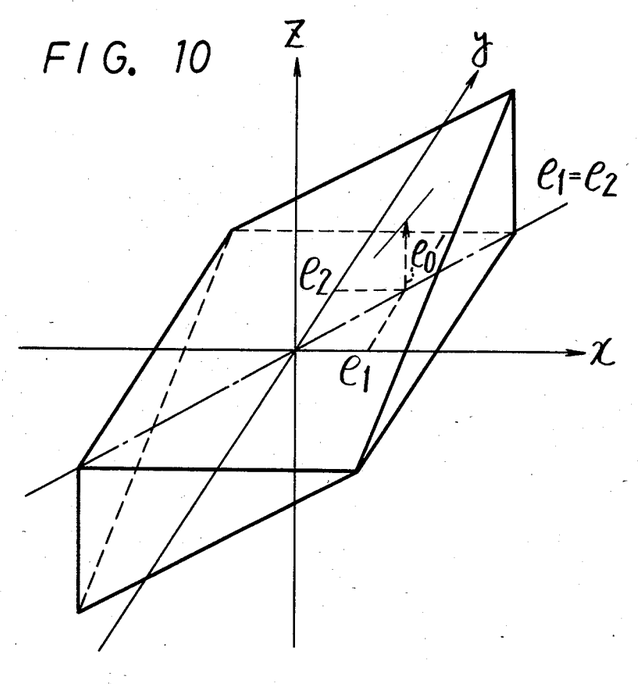
FIG. 10 is a graph showing an output characteristic according to a conventional comb filter.

Thus the output characteristic thereof becomes as shown in FIG. 10, and since the filtering processings are carried out for signal levels existing on the planes where the polarities of the amplitude levels $e_1$ and $e_2$ are different in the x and y plane, this invention has higher improvement factor of signal-to-noise ratio.

In the experiments, the conventional comb filter achieves the improvement factor of S/N ratio of only 3.0 dB, while the picture filter according to the present invention achieves the improvement factor of S/N ratio of 4.26 dB.

Figure 11:
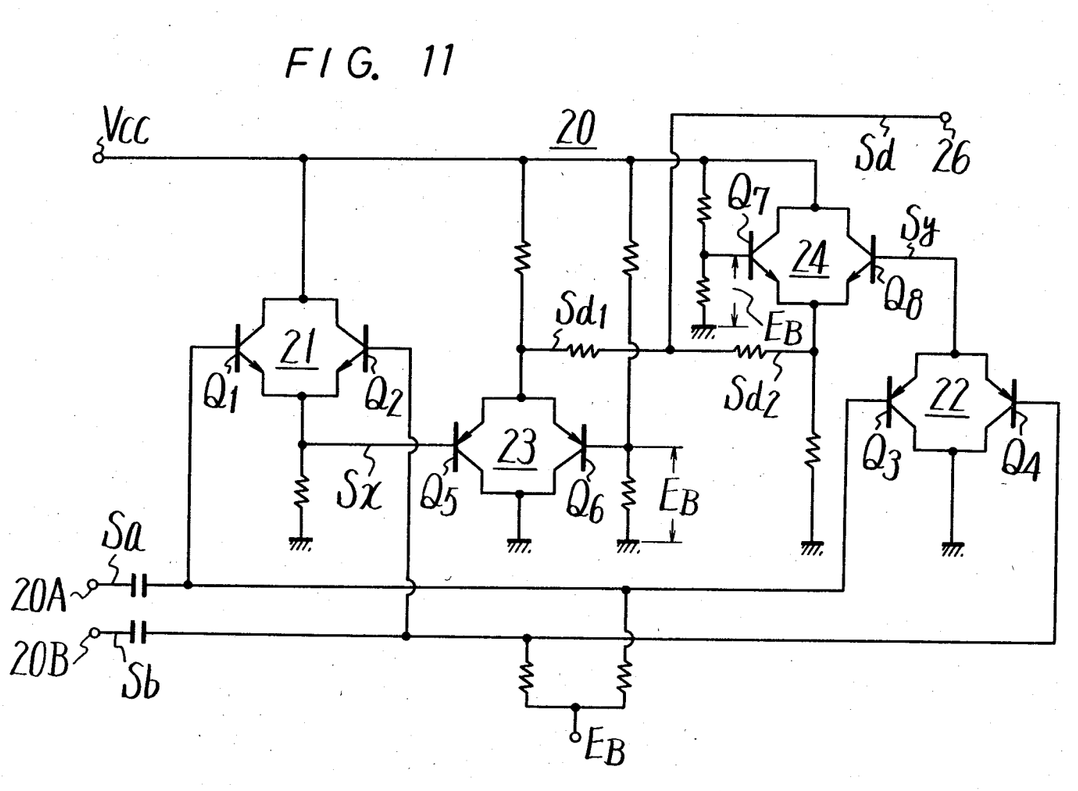
FIG. 11 is a connection diagram showing one example of an amplitude correlator.
Figure 12A:
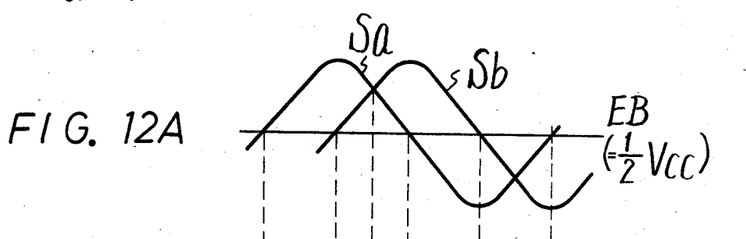
FIGS. 12A–12E are waveform diagrams each used to explain the operation thereof.
Figure 12B:
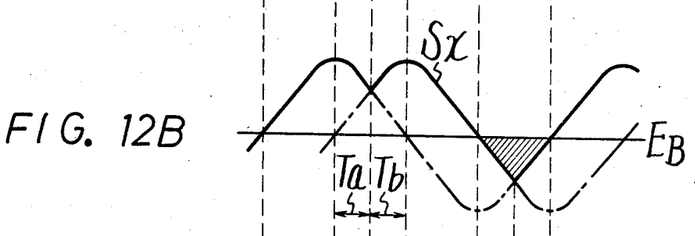
Figure 12C:
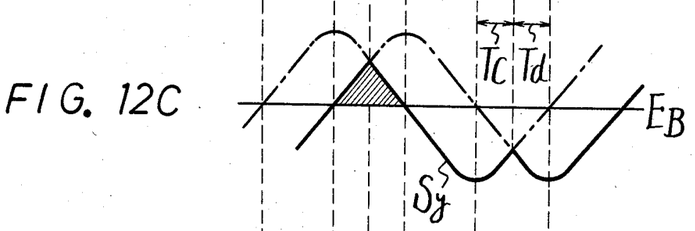

The aforesaid amplitude correlator 20 can be arranged as, for example, shown in FIG. 11. In this embodiment, the amplitude correlator 20 is composed of four differential amplifiers 21 to 24, in which transistors $Q_1$ and $Q_3$ are supplied at their bases with a signal Sa superimposed upon a predetermined DC bias $E_B$ (for example, $\frac{1}{2}V_{cc}$), while transistors $Q_2$ and $Q_4$ are supplied at their bases with a signal Sb superimposed upon the same DC bias $E_B$. Since the first differential amplifier 21 acts as the logical sum, now that a pair of the signals Sa and Sb are inputted thereto with a state shown in FIG. 12A, a common emitter output (first logical sum output) Sx of the transistors $Q_1$ and $Q_2$ becomes as shown in FIG. 12B. Also, the second differential amplifier 22 functions as the logical product so that a common emitter output (first logical product output) Sy becomes as shown in FIG. 12C.

Figure 12D:
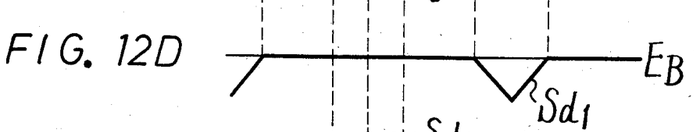
Figure 12E:
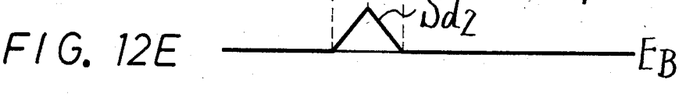

The third differential amplifier 23 to which the first logical sum output Sx is supplied is arranged to function as the logical product. Thus a second logical product output $Sd_1$ produced therefrom becomes as shown in FIG. 12D. Moreover, since the fourth differential amplifier 24 to which the first logical product output Sy is supplied is arranged to function as the logical sum, a second logical sum output $Sd_2$ shown in FIG. 12E is obtained therefrom. Then, a composed output of these outputs $Sd_1$ and $Sd_2$ is obtained from a terminal 26.

The polarities and amplitude levels are discriminated as described above, whereby during interval Ta the signal Sb with a smaller amplitude level is produced, similarly during interval Tb the signal Sa is produced and during intervals Tc and Td signals with smaller amplitude levels are likewise produced.

Figure 13:
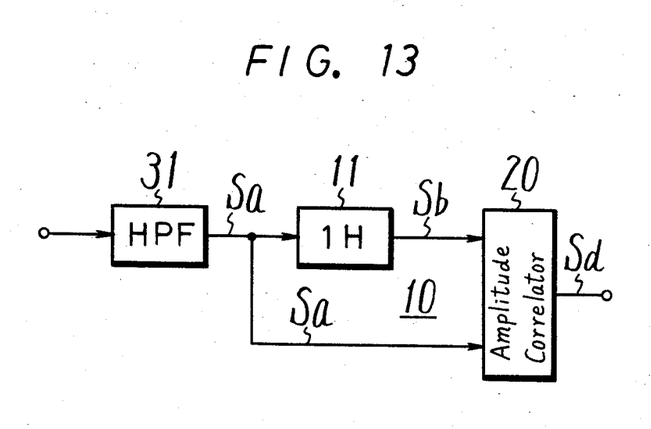
FIGS. 13 to 15 are systematic diagrams of main parts each showing an applied example of this invention.

By the way, in the aforesaid embodiment, the television signal per se of wide frequency band is supplied to the picture filter thereby subjected to the filtering processing. But, when as shown in FIG. 13 the television signal Sa passed through a high pass filter 31 and having only the high frequency band components is subjected to the filtering processings, no low frequency band component thereof is subjected to the filtering processings at all. Thus the resolution at the low frequency band side is not deteriorated.

Figure 14:
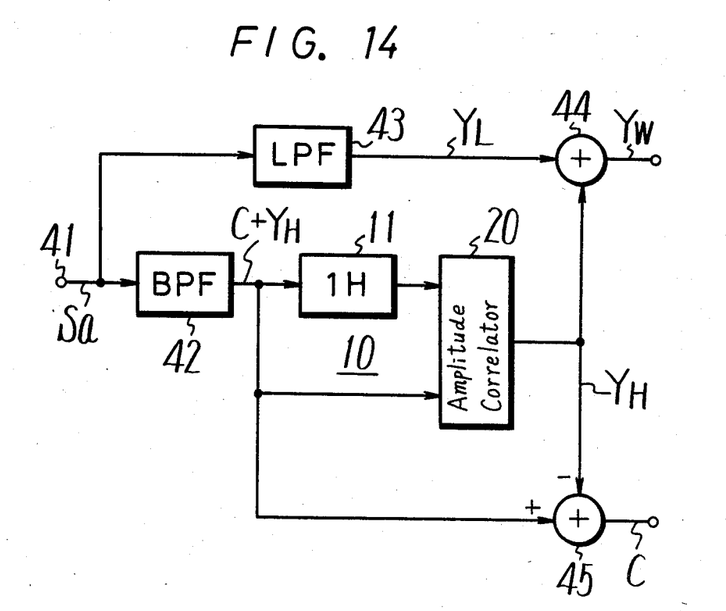

FIG. 14 shows a second embodiment of this invention. In this embodiment, the picture filter is utilized as a separating circuit for a luminance signal and a chrominance signal. The television signal Sa applied to a terminal 41 is supplied to a band pass filter 42, in which a frequency range where a luminance signal $Y_W$ and a carrier chrominance signal C are multiplexed with each other is separated. This multiplexed signal $(Y_H + C)$ ($Y_H$ represents the high frequency band component of $Y_W$) thus separated is supplied to the aforesaid picture filter 10.

Of the multiplexed signal $(Y_H + C)$, the carrier chrominance signal C has its subcarrier inverted in phase at each 1H so that the amplitude level of the carrier chrominance signal C is distributed on the plane in the x and y planes where the axis $e_1 = -e_2$ exists (refer to FIG. 5). Accordingly, when the multiplexed signal $(Y_H + C)$ is supplied to the picture filter 10, the carrier chrominance signal C is regarded as the noise component and then processed so that the amplitude correlator 20 produces only the high frequency band luminance signal $Y_H$.

This high frequency band luminance signal $Y_H$ is added with a low frequency band luminance signal $Y_L$, which is produced from a low pass filter 43, in an adder 44, from which the luminance signal $Y_W$ with wide frequency band containing no chrominance signal is generated. After phase-inverted, this high frequency band luminance signal $Y_H$ is added to the multiplexed signal ($Y_H+C$), by which the carrier chrominance signal C is separated and then produced. Reference numeral 45 denotes an adder for such purpose.

As stated above, if the picture filter 10 is utilized, it is possible to separate the luminance signal $Y_W$ and the carrier chrominance signal C therefrom. The above signal separation may be carried out at the stage of color difference signals (R−Y) and (B−Y) after the carrier chrominance signal C was demodulated.

Figure 15:
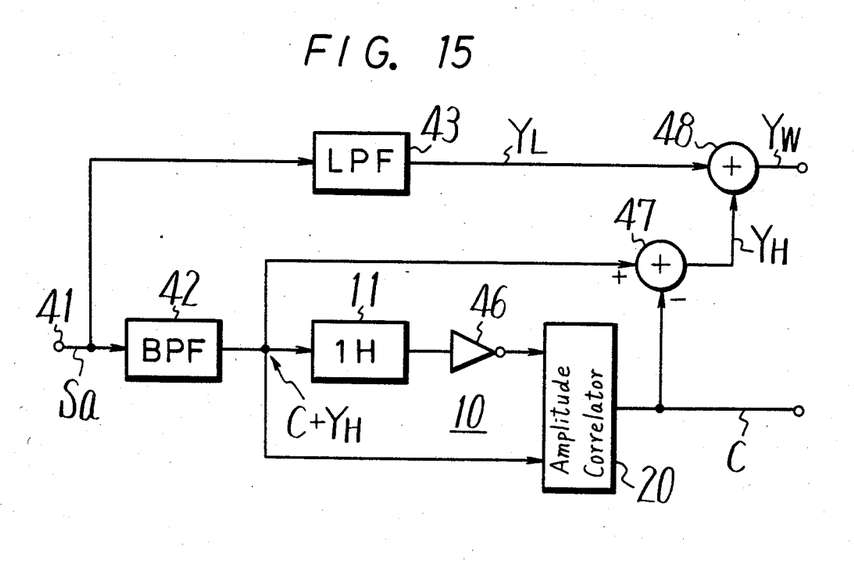

While in the embodiment of FIG. 14 the picture filter 10 is utilized to separate the high frequency band luminance signal $Y_H$ from the carrier chrominance signal C, the carrier chrominance signal C can be separated therefrom. FIG. 15 shows an example thereof, and in this embodiment, the multiplexed signal ($Y_H+C$) delayed by 1H by the delay circuit 11 is inverted in phase by an inverter 46, and then supplied to the amplitude correlator 20.

Figure 16:
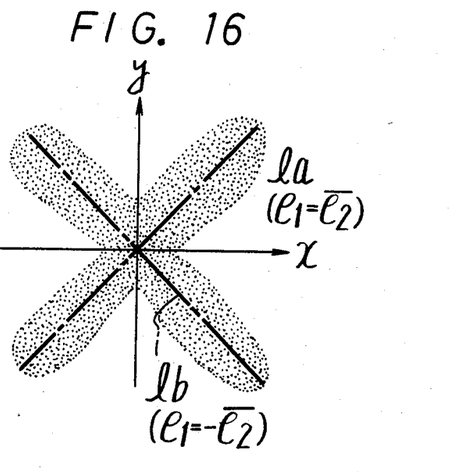
FIG. 16 is a scattering diagram used to explain FIG. 15.

By the insertion of the inverter 46, since the subcarriers of the carrier chrominance signals C in the adjacent horizontal periods are made in phase with each other, as shown in FIG. 16 the amplitude level of the carrier chrominance signal C is distributed on the axis $e_1 = e_2$ (straightline 1a) as shown in FIG. 16 and the amplitude level of the high frequency band luminance signal $Y_H$ is distributed on the axis $e_1 = -e_2$ (straightline 1b) which differes from the former by 90° in phase, resulting in that the amplitude correlator 20 produces only the carrier chrominance signal C.

The carrier chrominance signal C thus amplitude-separated is phase-inverted and then added with the multiplexed signal ($Y_H+C$) at an adder 47, from which the high frequency band luminance signal $Y_H$ is produced. Besides, it is added with the low frequency band luminance signal $Y_L$ by an adder 48 thus a luminance signal $Y_W$ with a wide frequency band being formed. As stated above, if the picture filter 10 is utilized, it is possible to separate the luminance signal $Y_W$ and the chrominance signal, which are multiplexed with each other, based upon the amplitude level.

As described above, in accordance with the present invention, when only the signal relating to the content of the picture is separated from the video signal which contains a plurality of signals having different information contents, the separation is not carried out on the frequency axis as in the prior art filter, but on the amplitude level axis space. Thus this invention has such a feature that the signal to be separated can be separated with more accuracy. Therefore, according to this invention besides the elimination of the noise component, the plurality of signals having different information contents can be separated without influencing the respective signals.

While in the respective embodiments, the secondary picture filter is described, in which the amplitude levels $e_1$ and $e_2$ of the adjacent two points in the picture are subjected to the filtering processings in the spaces of two amplitude level axes x and y, it is needless that the picture filter can be constructed as a picture filter of ternary or more, in which the amplitude levels $e_1, e_2, e_3 \ldots$ of more than adjacent three points are subjected to the filtering process in the amplitude level axis spaces more than three points. The picture filter of ternary or above can discriminate the signal to be separated more precisely. Therefore, if it is used as the picture filter of, for example, the noise elimination use, it has a practical advantage that the improvement factor of S/N ratio can be improved much more.

We claim:

1. A picture filter for extracting a selected component from a video signal which includes a noise component and which is periodically sampled to produce input samples having respective total amplitudes, said picture filter comprising;
   means receiving said input samples for selecting at least first and second input samples therefrom, and
   correlation detection means receiving said at least first and second selected samples and detecting correlation and non-correlation of the respective total amplitudes thereof, said correlation detecting means including means for producing said selected component without said noise component only in response to detection of positive correlation between said total amplitudes of the selected samples.

2. A picture filter for extracting a selected component from a video signal including a noise component, where said video signal is periodically sampled to produce input samples having respective total amplitudes, said picture filter comprising:
   means for selecting at least first and second ones of second input samples, and
   correlation detection means receiving said at least first and second selected samples for detecting when the respective amplitudes thereof are positively correlated and for producing said selected component without said noise component in response to said detected correlation, wherein said correlation detection means includes:
   a source of a DC bias voltage;
   first and second differential logic means each having a first input receiving the sum of the amplitude of said first selected sample and said bias voltage, a second input receiving the sum of the amplitude of said second selected sample and said bias voltage, said first differential logic means having an output corresponding to the logical sum of the inputs and said second differential logic means having an output corresponding to the logical product of the inputs;
   third differential logic means having a first input receiving the output of said first differential logic means, a second input receiving said bias voltage, and an output corresponding to the logical product of the inputs;
   fourth differential logic means having a first input receiving the output of said second differential logic means, a second input receiving said bias voltage, and an output corresponding to the logical sum of the inputs; and
   means for summing the outputs of said third and fourth differential logic means to produce said selected component.

3. A picture filter according to claim 2; wherein each of said differential logic means is a differential amplifier.

4. A picture filter according to claim 1, wherein said means for selecting includes delay means for delaying said input samples by successive integral multiples of the sampling period to produce said selected samples other than said first sample as delayed samples.

5. A picture filter according to claim 4, wherein said video signal is periodically sampled at 1H intervals, and said delay means includes a plurality of 1H delay means.

6. A picture filter according to claim 5, wherein said input samples include a chrominance component and a wideband luminance component having high and low frequency luminance components, and said picture filter further comprises filter means disposed before said means for selecting and receiving said input samples for supplying filtered samples containing only desired frequency components to said means for selecting.

7. A picture filter according to claim 6, wherein the number of selected samples is 2, said first selected sample being one of said filtered samples and said second selected sample being another filtered sample delayed by a period of 1H.

8. A picture filter according to claim 6, wherein said selected component is said high frequency luminance component, and said filter means includes high pass filter means which does not pass said low frequency luminance component.

9. A picture filter for extracting a selected component from a video signal including a noise component, where said video signal is periodically sampled to produce input samples having respective total amplitudes, said picture filter comprising:
   means for selecting at least first and second ones of said input samples; and
   correlation detection means receiving said at least first and second selected samples for detecting when the respective amplitudes thereof are positively correlated and for producing said selected component without said noise component in response to said detected correlation;
   said means for selecting including delay means for delaying said input samples by successive integral multiples of the sampling period to produce said selected samples other than said first selected sample as delayed samples, said video signal being periodically sampled at 1H intervals, and said delay means including a plurality of 1H delay means;
   said input samples including a chrominance component and a wide band luminance component having high and low frequency luminance components, and said picture filter further comprising filter means disposed before said means for selecting and receiving said input samples for supplying filtered samples containing only desired frequency components to said means for selecting;
   wherein said selected component is said chrominance component and said filter mean includes band pass filter means which passes said chrominance and high frequency luminance components but not said low frequency luminance component, said picture filter further comprising:
   inverting means disposed between said 1H delay means and said correlation detection means for inverting said second selected sample;
   low pass filter means receiving said unfiltered input samples and passing only said low frequency luminance component thereof;
   first adder means for adding said filtered samples to the negative of the selected component output from said correlation means for producing said high frequency luminance component; and
   second adder means for adding said high frequency luminance component output from said first adder means to said low frequency luminance component output from said low pass filter means for producing said wide band luminance component.

10. A picture filter according to claim 6, wherein said selected component is said high frequency luminance component and said filter means includes band pass filter means which passes said chrominance and high frequency luminance components but not said low frequency luminance component, said picture filter further comprising:
    low pass filter means receiving said unfiltered input samples and passing only said low frequency luminance component thereof; and
    adder means for adding said low frequency luminance component from said low pass filter means to said selected component output from said correlation detection means to produce said wideband luminance component.

11. A picture filter for extracting a selected component from a video signal including a noise component, where said video signal is periodically sampled to produce input samples having respective total amplitudes, said picture filter comprising:
    means for selecting at least first and second ones of said input samples, and
    correlation detection means receiving said at least first and second selected samples for detecting when the respective amplitudes thereof are positively correlated and for producing said selected component without said noise component in response to said detected correlation;
    said means for selecting including delay means for delaying said input samples by successive integral multiples of the sampling period to produce said selected samples other than said first selected sample as delayed samples, said video signal being periodically sampled at 1H intervals, and said delay means including a plurality of 1H delay means, said input samples including a chrominance component and a wide band luminance component having high and low frequency luminance components, and said picture filter further comprises filter means disposed before said means for selecting and receiving said input samples for supplying filtered samples containing only desired frequency components to said means for selecting, wherein said selected component is said high frequency luminance component and said filter means including band pass filter means which passes said chrominance and high frequency luminance components but not said low frequency luminance component;
    said picture filter further comprising:
    low pass filter means receiving said unfiltered input samples and passing only said low frequency luminance component thereof;
    first adder means for adding said low frequency luminance component from said low pass filter means to said selected component output from said correlation detection means to produce said wide band luminance component; and
    second adder means for adding said filtered input samples and the negative of said selected component output from said correlation detection means to produce said chrominance component.

* * * * *